Aug. 4, 1936.  J. C. DRADER ET AL  2,049,491
METHOD OF FORMING HOBS FOR BEVEL GEARS
Filed Oct. 6, 1933  2 Sheets-Sheet 1
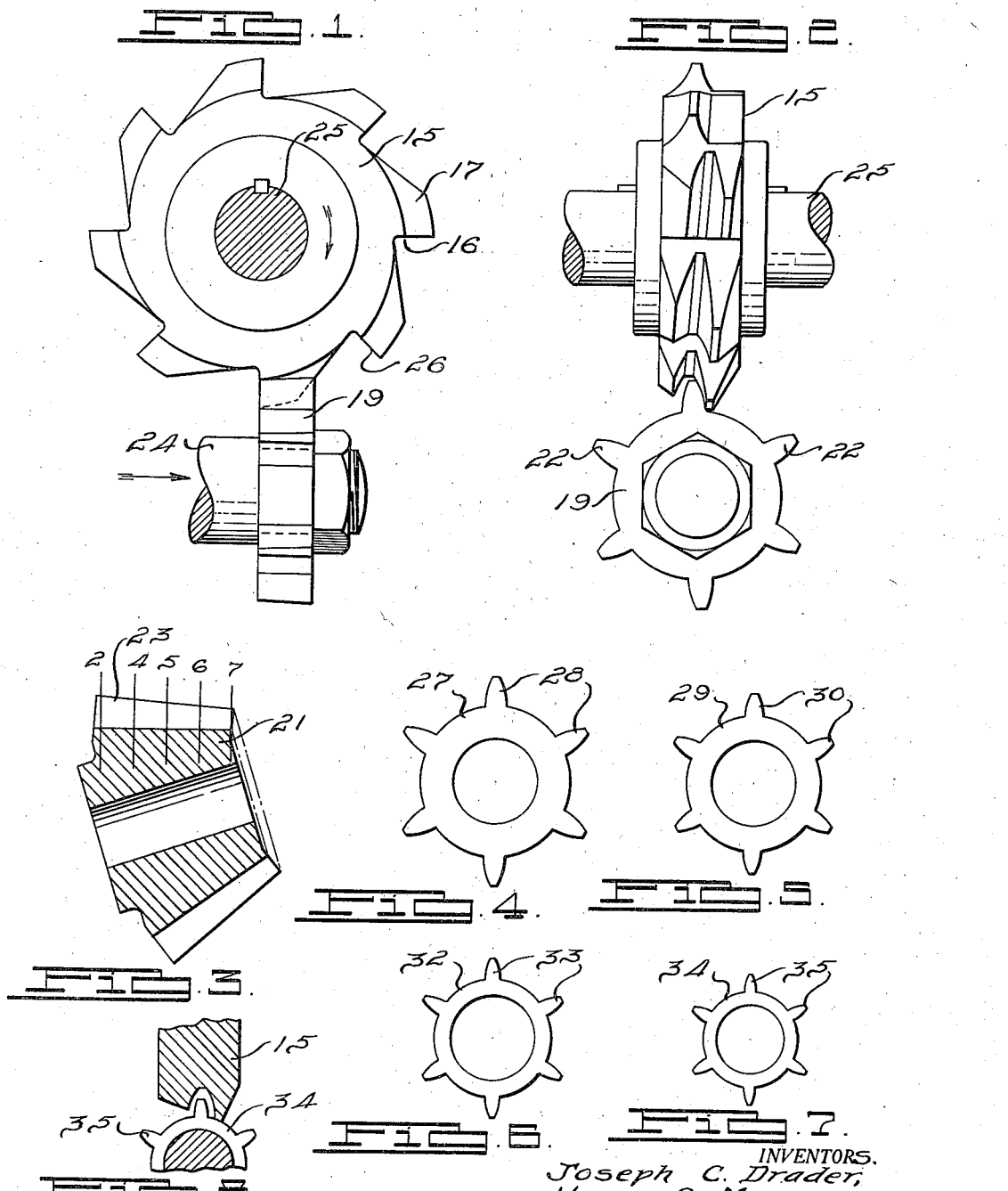
INVENTORS.
Joseph C. Drader,
Henry Q. Munn.
BY
Barnes, Dickey, Pierce & Hann.
ATTORNEYS.

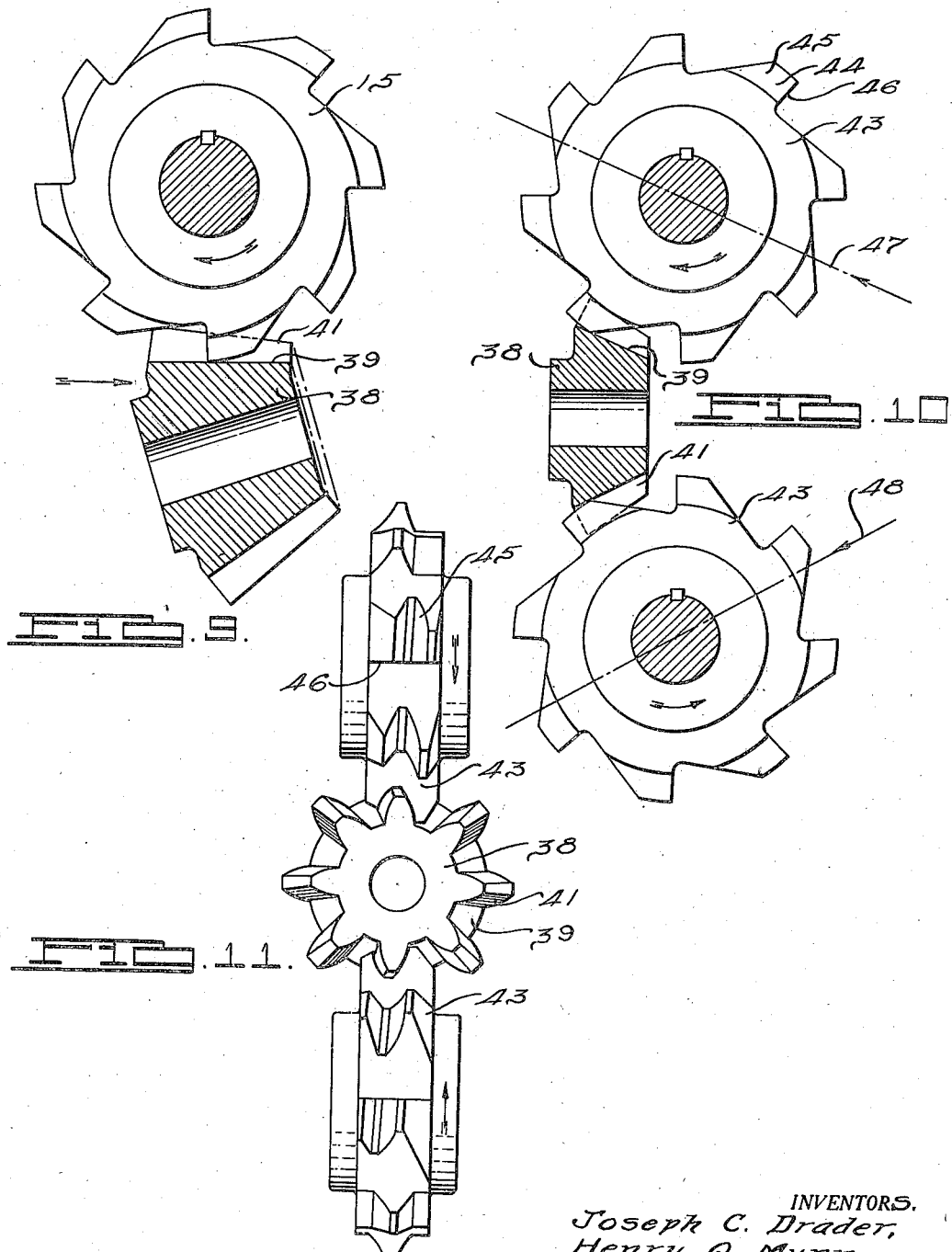

Patented Aug. 4, 1936

2,049,491

UNITED STATES PATENT OFFICE 2,049,491

METHOD OF FORMING HOBS FOR BEVEL GEARS

Joseph C. Drader and Henry Q. Munn, Detroit, Mich.

Application October 6, 1933, Serial No. 693,228

6 Claims. (Cl. 76—101)

Our invention relates to cutting tools and particularly to a method of manufacture of hobs employed for machining teeth on bevel gear blanks.

In view of a bevel gear having a conical shaped body portion, the teeth thereof are of changing form throughout their length, all sections thereof being of different height, pitch and root width, with the crown of the teeth in sloping relation to their roots. For this reason difficulty has always been experienced in machining bevel gears, especially in mass production when large numbers are produced, such, for example, for the differential of an automobile.

The rapid production of bevel gears is made possible by the present hobbing tool which machines the bevel gear in substantially the same manner as other types of gears are machined by a conventional hob. For producing the hob, a number of cutters are constructed the teeth of which are duplicates of the form at various sections throughout the length of the tooth of the bevel gear. These cutters are employed to successively cut the teeth of the hob so that, in the aggregate, forms are produced on the teeth of the hob which, when passed through a work piece, produce teeth thereon which substantially conform to the various shapes of the teeth of the cutter having the profile of various sections of the bevel gear tooth. The greater number of cutters that are employed the more accurate will be the tooth form reproduced by the hob.

Accordingly, the main objects of our invention are to machine a hob with a plurality of cutters, the tooth forms of which are proportional to sections of the bevel gear teeth at various points throughout their length; to construct a plurality of cutters having teeth thereon conforming to the profile of various sections of a tooth to be produced thereby; to pass the plurality of teeth of different cutters in sequence through the hob to form teeth thereon some of which have a composite profile of all of the forms of teeth on the various cutters; to construct a hob having teeth thereon the forms of some of which are a composite of a plurality of cutters, the teeth of which conform to various sections of a bevel gear tooth to be cut by the hob; to relieve the hob radially, when one hob is employed for cutting a work piece to produce a bevel gear, to eliminate a change in the tooth form when sharpened; to employ two hobs when side relief is provided on the teeth so that the reduction of width of the teeth due to a sharpening operation can be compensated for through the relative adjustment of the work and hobs; to mount the hobs so as to cut on opposite sides of the teeth of the work piece; and, in general, to provide a hob and a method of making the same capable of cutting teeth on bevel gears, which is simple in construction and operation and which produces an accurate tooth form.

Other objects and features of novelty of our invention will be either specifically pointed out or will become apparent when referring, for a better understanding of our invention, to the following description taken in conjunction with the accompanying drawings, wherein:

Figure 1 is a broken view, partly in section and partly in elevation, of a hob and cutter embodying features of our invention, Fig. 2 is a side view of the structure illustrated in Fig. 1, Fig. 3 is a sectional view of a bevel gear to be produced by the hob illustrated in Figs. 1 and 2, Fig. 4 is a plan view of a cutter having teeth thereon which conform to the profile of a tooth of the bevel gear of Fig. 3 taken on the line 4 thereof, Fig. 5 is a plan view of a cutter having teeth which conform to the profile of the tooth of the bevel gear of Fig. 3 taken on the line 5 thereof, Fig. 6 is a plan view of a cutter having teeth thereon the profile of which conforms to the shape of the tooth of the bevel gear of Fig. 3 taken on the line 6 thereof, Fig. 7 is a plan view of a cutter having teeth thereon the profile of which conforms to the shape of the tooth of the bevel gear illustrated in Fig. 3 taken on the line 7 thereof, Fig. 8 is a broken sectional view of structure which illustrates the operation of the cutter shown in Fig. 7 when shaping the teeth of the hob, Fig. 9 illustrates the operation of the hob when cutting teeth on a bevel gear, Fig. 10 illustrates the employment of two hobs operating on the teeth of a gear of the bevel type, and Fig. 11 is an end view of the structure illustrated in Fig. 10.

The hob of the present invention is of the single position type, that is to say, it is positioned on a rotatable axis and is fixed relative to its plane of rotation. For this reason the hob is limited in width and has substantially a thread of single lead divided into a plurality of teeth. This hob 15 is clearly illustrated in Figs. 1 and 2. The blank has a plurality of flutes or notches 16 cut therein to form teeth 17 thereon, preferably before the cutting of the thread in view of the radial relief provided for each of the teeth. For machining the thread, a plurality of cutters are employed, a cutter 19 being first utilized to substantially shape the thread to desired form. The cutter is made in conformity with the work to be produced, which is illustrated in Fig. 3. This bevel gear 21 is of the type desired to be reproduced by the hob. The teeth 22 on the cutting tool 19 have a profile corresponding to the profile of the tooth 23 on the bevel gear 21 at the line 2 thereof. While the pitch diameter of the tooth 22 will be different from the pitch diameter of the profile at the section 2 of the bevel gear, in view of the relation of the bevel gear and the spur type of cutter, nevertheless the pitch diameters of the profiles of the teeth of the various cutters are proportional to the actual pitch diameters, at corresponding points, of the tooth on the work piece. The cutter 19 and hob blank 15 are rotated in synchronism at a speed proportional to the number of teeth 22 provided on the cutter. After the thread is cut to shape, a radial relief is provided thereon by uniformly advancing the shaft 24 towards the shaft 25 during the machining of each tooth so as to progressively decrease the radius thereof from the front face 26 of each tooth. In this manner, the front face 26 may be ground away from time to time to sharpen the teeth and at the same time the profile of the teeth will remain exactly the same.

A second cutter 27 is then substituted for the cutter 19 with the teeth 28 thereof provided with a profile corresponding to the profile of the bevel gear tooth 23 at the intersection of line 4 thereof. The center line of the teeth 28 are positioned on the centerline formerly occupied by the teeth 22 and the cutter 28 is advanced radially to depth. The hob 15 is then further machined by the teeth 28 during the time the shaft 24 is advanced toward the shaft 25 to follow the radial relief provided on each of the teeth. Since the shafts 24 and 25 are operated at the same relative speeds, the peripheral speed of the cutter has been reduced corresponding to its reduced diameter. As a result, with the cutter teeth spaced from the complete female profile, this profile will never be changed, but the sides of the teeth remote therefrom will be cut away in the presence of the reduced relative peripheral speeds.

Thereafter a cutter 29 having teeth 30 thereon, which has a profile proportional to the profile of the bevel gear tooth 23 at the intersection of the line 5 thereof, is substituted for the cutter 27. The cutter 29 will machine different portions of the hob teeth 17 remote from the complete female profile during the operation of the hob and cutter in synchronism. During such operation, the shaft 24 is advanced toward shaft 25 so that the machining of a tooth will follow the radial relief provided thereon.

Thereafter cutter 32 is substituted for the cutter 29 having teeth 33 thereon the profile of which is proportional to the profile of the tooth 23 at the intersection of the line 6 thereof. This cutter will further machine some of the hob teeth 17 in the above described manner when operated in synchronism with the hob and advanced radially during the cutting of each of the teeth to machine along the radial relief provided thereon. A cutter 34 is thereafter substituted for the cutter 32 having teeth 35 thereon the profile of which is proportional to the profile of the tooth 23 of the bevel gear 21 at the intersection of the line 7 thereof. The cutter 34 operates in the same manner as the aforementioned cutters relative to the hob to remove additional amount of material from some of the teeth to have a portion of their surface conform to the shape of the tooth 23 at the intersection of the line 7. The cutter 34 is advanced radially toward the shaft 25 to have the machining follow the radial relief provided on the hob teeth. In this manner a thread is cut on a hob having, at the overlapping portion, a complete female profile of the largest cutter tooth. This profile is never changed because of the setting of the teeth of subsequent cutters in centerline relation, with the cutting edges spaced from the hob teeth flanks. The change in peripheral speeds causes the teeth of subsequently employed cutters to machine the hob teeth flanks remote from the set position so that some of the hob teeth are further and repeatedly machined until a composite of all of the cutter teeth forms will be provided on some of the hob teeth. This change in cutting is effected by the different peripheral speeds of the cutters and since the peripheral speed of the points throughout the length of the bevel gear is likewise changing during a machining operation, the portions on the hob cut by the teeth of the various cutters will be available to cut the teeth of the bevel gear at the points of similar peripheral speeds. While the hob herein illustrated and described is of the single thread type, it is to be understood that a similar hob of the multi-thread type could be utilized.

In Fig. 8 we have illustrated the set position of the cutter 34 relative to the hob 15 to show the spacing of the tooth 35 relative to the complete female profile at the overlapped portion of the hob teeth 17. The teeth 17 are thereby progressively formed in accordance with any number of sections of the tooth 23 which may be chosen, the composite of which is reproduced on the bevel gear blank to be machined. The more of these sections employed, that is to say, the more of the cutters conforming to a larger group of sections between the lines 2 and 7 of Fig. 3 the greater accuracy in the production of bevel gears by the hob will result. For roughing out a gear only cutters corresponding to sections 2 and 7 need be employed, while if the bevel gear is to be finished by the hob, a larger number of the cutters, as illustrated, will be utilized for shaping the composite forms on the hob teeth.

The same operation obtains when the bevel gear is cut by the hob except for the omission of the radial movement between the shafts 24 and 25 of the hob and cutter. The only reason this movement was employed was to reduce the radius of curvature of each tooth to produce a relief from the front cutting edge 26 and retain the desired profile throughout the tooth length. As the face 26 of each of the teeth 17 are ground away as a result of a sharpening operation, the resulting form of the teeth will always remain the same.

The operation of the finished hob 15 to produce a bevel gear 38 is illustrated in Fig. 9, wherein the bevel gear is disposed to have a plane through the root 39 of a tooth 41 disposed normal to a radius of the hob 15. This is the position the plurality of cutters assumed when machining the hob teeth and the same relation is utilized when producing the bevel gear 38 by the hob. The hob and bevel gear are operated in synchronism with each other during the machining operation and the bevel gear and hob are relatively advanced parallel to the plane through the root 39 of the bevel gear tooth until they pass completely across each other. During such passage, the radius of the bevel gear and therefore its peripheral speed is constantly increasing so that all forms on the hob teeth progressively cut the proper profile. It is to be understood that the hob 15 or the gear 38 could be moved and that the actual machining of the teeth 41 follows the conventional method of machining gears and cutters when operating in synchronism.

As a further extension of our invention, we have illustrated a pair of hobs 43 in Figs. 10 and 11, the teeth 44 of which are provided with side relief rather than radial relief. That is to say, the side faces 45 of the teeth 44 are reduced in thickness from their front face 46, so that the profile at the cutting edge 46 is always wider than the portion of the tooth therebeyond. However, when this type of cutter is employed the width of each of the teeth 44 is reduced in diameter as the front cutting edge 46 recedes from the edge illustrated in the figure, caused by the sharpening operations. For this reason the teeth 41 on subsequent gears will be different from those provided on earlier cut gears if a single hob is employed similar to one illustrated in Fig. 10.

To overcome this, two hobs 43 are utilized and mounted to be movable in an angular direction of each other indicated by the lines 47 and 48 of Fig. 10. The angle between the lines 47 and 48 is the angle existing between the roots 39 of diametrically opposite teeth which will be parallel to the lines 47 and 48 or be normal to the radius of the hob 43. The machining operation is substantially the same as above described with regard to Fig. 9. The gear 38 operates in synchronism with the rotation of the hob 43 during the time the hobs slowly progress along the lines 47 and 48 until the teeth completely pass across the teeth 41 of the bevel gear. To compensate for any torsional strains the teeth of the hods 43 operate on opposite sides of the gear teeth as illustrated more clearly in Fig. 11, where the uncut left hand flank of a tooth at the top of the gear will be disposed on the right hand side of the gear at the bottom thereof.

When the teeth become narrower in width due to the sharpening operation, it is only necessary to advance both of the hobs to the left or the gear to the right a slight amount in accordance with half the amount the teeth are reduced in width. While we have illustrated and described the hob 43 relative to Figs. 10 and 11 as having no radial relief and having only side relief, it is to be understood that the same method can be employed with cutters having both a radial and side relief provided on the teeth. In some instances it may be desirable to employ both the side and radial relief on the hob.

While we have described and illustrated but two embodiments of our invention, it will be apparent to those skilled in the art that various changes, omissions, additions and substitutions may be made therein without departing from the spirit and scope of our invention, as set forth in the accompanying claims.

We claim as our invention:

1. The method of forming a hob for machining teeth on bevel gears which includes the steps, of first shaping the hob to substantial form by a cutter having teeth the profile of which is substantially that of the bevel gear tooth at the large end thereof, of rotating the cutter and hob blank in synchronism with each other during the relative movement of one across the other, of thereafter passing a plurality of cutters in sequence across the teeth of the hob so formed, the teeth of said cutters having pitch diameters corresponding to the pitch diameters of the teeth to be cut at various sections frontwardly of the large end thereof, the angular velocity of said hob relative to said cutters remaining uniform during said passing, so that said cutters machine portions of said hob because of the different peripheral speeds of said cutters.

2. The method of machining a hob for producing teeth on a bevel gear which includes utilizing a plurality of cutters, the teeth of which respectively correspond in form and size to the form and size of the teeth of the bevel gear at a plurality of points between the small and large end thereof; and successively passing said cutters across said hob, the speeds of the respective cutters relative to the speed of the hob in said passing being in accordance with the peripheral speeds of the corresponding points on the bevel gear.

3. The method of machining a hob for producing teeth on a bevel gear which includes utilizing a plurality of cutters the teeth of which vary in pitch diameter conforming to sections of said bevel gear teeth; and successively passing said cutter teeth across said hob, the relative angular velocities of said hob and said cutters remaining uniform during said passing.

4. The method of machining a hob for producing teeth on a bevel gear which includes utilizing a plurality of cutters, the teeth of which respectively correspond in form and size to the form and size of the teeth of the bevel gear at a plurality of points between the small and large end thereof; successively passing said cutters across said hob, the speeds of the respective cutters relative to the speed of the hob in said passing being in accordance with the peripheral speeds of the corresponding points on the bevel gear; and of angularly advancing the cutters and hob relative to each other during the machining of each tooth of said hob to provide side relief thereto rearwardly of the front cutting edge.

5. The method of machining a hob for producing teeth on a bevel gear which includes utilizing a plurality of cutters, the teeth of which respectively correspond in form and size to the form and size of the teeth of the bevel gear at a plurality of points between the small and large end thereof; the speeds of the respective cutters relative to the speed of the hob in said passing being in accordance with the peripheral speeds of the corresponding points on the bevel gear; and of radially advancing the hob and cutters relative to each other during the machining of each tooth of said hob to provide a radial relief thereto rearwardly of the front cutting edge.

6. The method of machining a hob for producing teeth on a bevel gear which includes, utilizing a plurality of cutters the teeth of which vary in pitch diameter conforming to sections of said bevel gear teeth, successively passing cutters across said hob when each is adjusted on proper center distance relative to said hob, maintaining the relative angular speeds of said hob and said cutters at a uniform value during said passing so that the peripheral speeds of said cutters relative to said hob vary, and of effecting the machining of portions of some of the hob teeth because of said changed relative peripheral speeds.

JOSEPH C. DRADER.
HENRY Q. MUNN.